(No Model.) 2 Sheets—Sheet 1.

H. H. BLADES.
COMBINED ELECTRIC MOTOR AND FAN.

No. 375,255. Patented Dec. 20, 1887.

WITNESSES
John E. Wiles.
Th. B. O'Dogherty.

INVENTOR
Harry H. Blades
By W. W. Leggett.
Attorney (No Model.) 2 Sheets—Sheet 2.

H. H. BLADES.
COMBINED ELECTRIC MOTOR AND FAN.

No. 375,255. Patented Dec. 20, 1887.

WITNESSES
John E. Wiles.
M. B. O'Dogherty.

INVENTOR
Harry H. Blades
By W. W. Leggett
Attorney

UNITED STATES PATENT OFFICE.

HARRY H. BLADES, OF DETROIT, MICHIGAN.

COMBINED ELECTRIC MOTOR AND FAN.

SPECIFICATION forming part of Letters Patent No. 375,255, dated December 20, 1887.

Application filed February 21, 1887. Serial No. 228,401. (No model.)

*To all whom it may concern:*

Be it known that I, HARRY H. BLADES, of Detroit, county of Wayne, State of Michigan, have invented a new and useful Improvement in Combined Electric Motors and Fans; and I declare the following to be a full, clear, and exact description of the same, such as will enable others skilled in the art to which it pertains to make and use it, reference being had to the accompanying drawings, which form a part of this specification.

My invention consists of the combinations of devices and appliances hereinafter specified, and more particularly pointed out in the claims.

Figure 1:
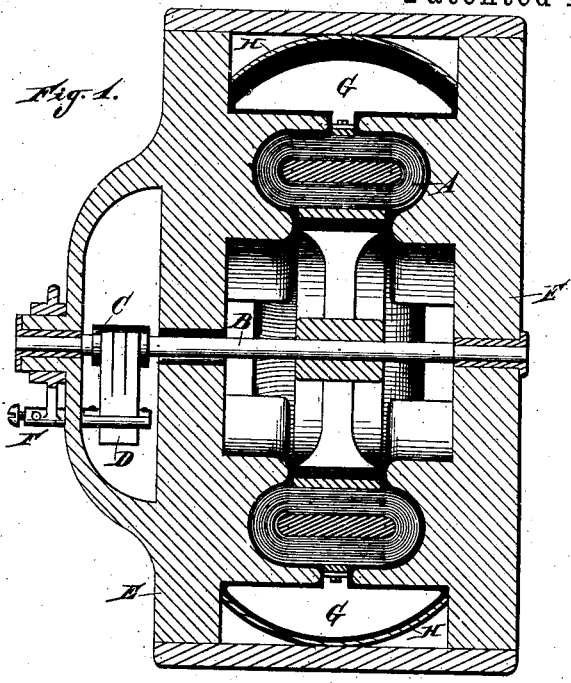
Figure 2:
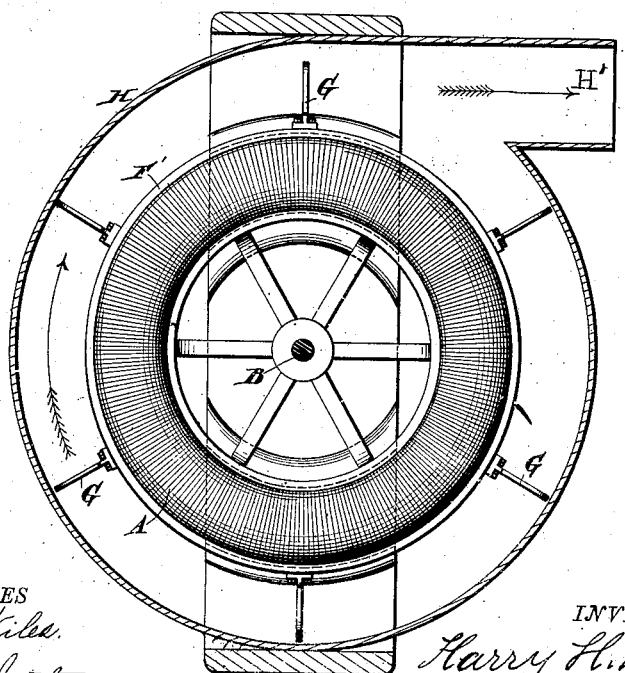
Figure 3:
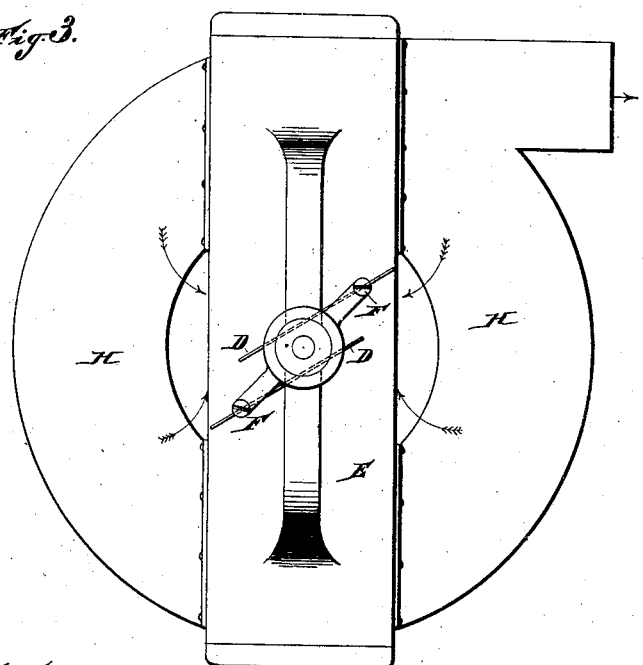
Figure 4:
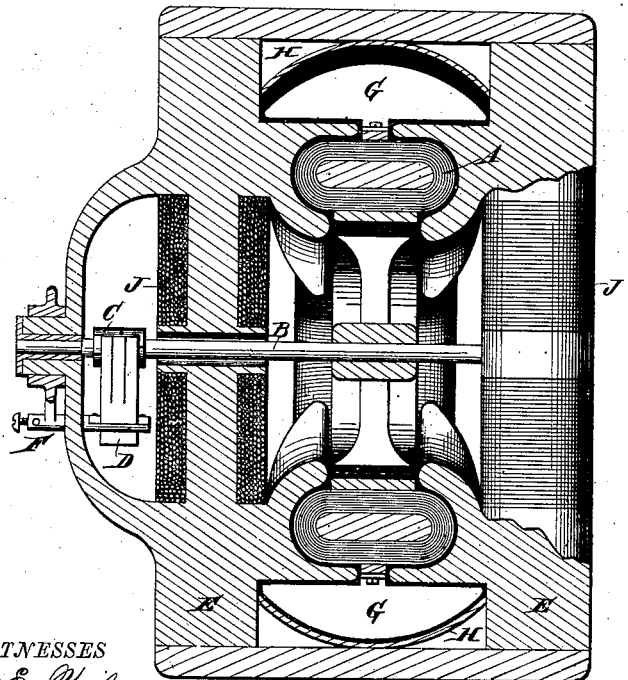

In the drawings, Figure 1 is a section on a vertical plane passed lengthwise of the shaft of a machine embodying my invention. Fig. 2 is a longitudinal section on a vertical plane at right angles to Fig. 1. Fig. 3 is a side elevation. Fig. 4 is a section, on a vertical plane in the direction of the shaft, of a variation of my invention, in which the field-pieces are wound in the usual way.

It is the purpose of my invention, primarily, to combine a fan with a motor directly, so that the blades of the fan shall project directly from the periphery of the armature in combining the same with a suitable fan-case, whereby the blast may be directed to its destination, the device being designed more especially for forging and other similar uses where a blast is required.

In carrying out my invention I propose to construct the motor either with or without field-magnets, and I would have it understood that my invention contemplates either form of the motor, and in fact comprehends the connection of fan-blades with the periphery of the armature of any dynamo-machine which will admit of such connection.

I will describe first that construction which dispenses with field-magnets.

A is the revolving armature; B, its shaft; C, its commutator; D, its brushes or other usual means for leading the current to and from the bobbins of the armature.

E represents field-pieces, of soft iron, which are arranged close to the armature, and are preferably so constructed to embrace as far as practicable the armature-ring at the points opposite the said field-pieces. These field-pieces, it will be observed, as shown in Figs. 1, 2, and 3, are not wound with wire, so that they are not field-magnets, but simply soft-iron field-pieces operating in the same manner that the field-magnets would operate, except with a less intensity.

F are the usual binding-posts for connecting the motor with the battery or primary generator.

G represents fan-blades arranged in any suitable number upon the periphery of the armature. They may be fastened in any suitable way, although I find the method shown in the drawings to be convenient, in which F' is a band of metal to which the blades are riveted.

H is a fan-case of any suitable form, and H' its discharge-conduit. This discharge-conduit may lead to the tuyere-box of a blacksmith's forge or to any other locality where the blast is required.

A device constructed in this manner obviates to a large extent the expense usually attendant on combining the fan with a motor. So, also, there are the least weight and quantity of material, and the whole mechanism is grouped in the least possible space, requiring no length of shaft only what is necessary to support the armature.

I would have it understood that the fan-blades may be made smaller or larger and have any suitable shape to correspond with the requirement of any particular use to which it is to be applied, and correspond also with the strength of the current employed to drive the motor.

The same apparatus as above explained may be provided with a winding of wire upon the field-pieces, so as to convert them into field-magnets. Such construction of the device is illustrated in Fig. 4 of the drawings, in which J represents the winding upon the field-magnets.

It is of course apparent that with the fan-blades made in suitable shape and with a case opening straight through from side to side, inclosing the motor and the fan-blades, the device may be thereby adapted for use as a ventilator-fan in the usual way.

What I claim is—

1. An electric fan for forges, &c., consisting of the combination, with the armature of an electric motor, of fan-blades secured directly to the periphery of the armature and a suitable fan-case for inclosing the armature and fan-blades and for confining and giving direction to the blast, substantially as and for the purpose described.

2. An electrical fan consisting of one or more unwound field-pieces of soft iron, an armature adapted to revolve with its bobbins in close proximity to said field-pieces, and fan-blades connected directly with the periphery of the armature, substantially as and for the purposes described.

In testimony whereof I sign this specification in the presence of two witnesses.

HARRY H. BLADES.

Witnesses:
N. S. WRIGHT,
M. B. O'DOGHERTY.